United States Patent Office 3,524,531
Patented Aug. 18, 1970

3,524,531
GALLERY-ROADWAY TRANSFER IN PIT COAL LONGWALL WORKING WHERE THE LONGWALL CONVEYOR LIES WITH ITS DRIVE HEAD IN THE BOTTOM ROADWAY
Werner Georg, Altlunen, Westphalia, Germany, assignor to Gewerkschaft Eisenhutte Westfalia, Wethmar, near Lunen, Germany
Filed Dec. 15, 1967, Ser. No. 690,982
Claims priority, application Germany, Mar. 22, 1967, G 49,637
Int. Cl. B65g 15/00
U.S. Cl. 198—188        21 Claims

ABSTRACT OF THE DISCLOSURE

A two conveyor transfer station for use in transferring solid material such as coal from a conveyor traveling in one direction to a conveyor traveling in a direction transverse to the first conveyor. The transfer station includes a deflecting plate obliquely across the first conveyor, suitably spaced from the first conveyor surface in a vertical direction, adapted to deflect large pieces of conveyed material to the second conveyor; and an opening and chute associated therewith behind the deflector adapted to receive fine pieces of conveyed material and transfer such from the first to the second conveyor. Overload safety means associated with the deflector may be provided to shut the conveyors down in the event of an overload on the deflector. This safety means may include a shear pin, pivot and switch means operative upon shearing of said pin and pivoting of said deflector.

---

Coal and other minerals are now often mined with the aid of plowing machinery which cut or scrape the mineral of the mine tunnel walls and cause such to fall upon a conveyor running generally parallel to the longwall of the tunnel being mined. As the longwall conveyor, and mined mineral carried thereby, emerges from the tunnel, it is often desirable to change the direction of flow of the mineral being carried. This is particularly true where side tunnels are being mined and the mineral taken from many side tunnels is to be combined in a single conveyed stream of mineral in the main tunnel from which the side tunnels branch.

It will be appreciated that any transfer of mineral from one conveyor to another creates and distributes a great deal of dirt. It will further be appreciated that there is also a tendency for the mineral being transferred from one conveyor to another to become clogged and entangled in the conveyor machinery. Where soft minerals, such as coal for example, are being mined, there is a strong tendency toward dusting which causes losses and impairment of moving machinery.

More or less large quantities of coal which are won by a coal plough or another winning machine guided on the conveyor which can no longer be loaded into the longwall conveyor at the end of the longwall gallery being mined are sometimes pushed into the roadway. In order to recover this coal, in addition to that retained on the longwall conveyor, a second, smaller conveyor can be provided. This second conveyor is frequently formed as an angle conveyor and in turn delivers onto the actual longwall conveyor. Even in this situation, soiling still occurs at the transfer point and is extremely burdensome. This soiling causes operating difficulties and hinders the supervision of the drive or drives of the coal plough and the longwall conveyor. Moreover, ordinarily the longwall conveyor is hydraulically anchored and this anchoring can be hindered by the soiling to such extent that the conveyor cannot be shifted forward in the working direction. Further pivoting, if necessary, cannot be carried out, or is difficult to carry out.

A further disadvantage is to be seen in the fact that there is very little available free space in the region of the coal transfer which available free space is further severely constricted by a second conveyor. Room for traveling and supervision of the machinery is urgently needed precisely at the mining tunnel exit. Where the main tunnel or roadway is of normal floor width, the roadway conveyor generally lies on the side opposite to the mouth of the side tunnel or gallery, that is at the farther face of the roadway. The angle conveyor mentioned above is usually arranged close to the nearer face. The anchoring stands between the two conveyors. As a whole thus the width of the roadway is so filled up with machinery that hardly any space remains for safe traveling.

It is therefore an object of this invention to provide a novel transfer apparatus for use in connection with mineral mining operation.

It is another object of this invention to provide an improved mechanism for transferring solid material between conveyors traveling in different directions.

It is a further object of this invention to provide a novel transfer apparatus adapted to relatively cleanly transfer solid material of various sized pieces between conveyors traveling in different directions.

Other and additional objects of this invention will become apparent from a consideration of this entire specification including the drawing and claims hereof.

In accord with and fulfilling these objects, one aspect of this invention includes a transfer apparatus assembly adapted to transfer various sized solids from a first conveyor to a second conveyor including deflection means traversing said first conveyor obliquely adapted to deflect large pieces of solid material from the first to the second conveyor; and chute means in the first conveyor through which small particle size material and fines are transferred from the first conveyor to the second conveyor.

The invention provides firstly for the separate transference of the material in coarse pieces and a large part of the fine material at the gallery exit. The coarse pieces are discharged laterally by a deflector onto the roadway conveyor, while the fine coal falls down through one or more openings in the bottom plate of the longwall conveyor onto the roadway conveyor.

The lower edge of the deflector should be positioned close to the longwall conveyor belt but raised therefrom a sufficient distance to permit the belt to pass thereunder unhindered. It is preferred that the lower edge of the deflector be about even with or somewhat above the sides of the longwall conveyor.

It is not uncommon for longwall conveyors to have an upper member thereon extending from one or both of sides or side guides. It is preferred in the practice of this invention to remove this upper guide from the longwall conveyor in the vicinity of the transfer apparatus described herein. The lateral discharge of the material in coarse pieces is simplified and facilitated by the omission of the upper guidance of the longwall conveyor. The guide on the side of the longwall conveyor in the direction of deflection may also be lowered somewhat or even entirely omitted. There is no danger of derailing of the conveyor chain since the taut chain is guided adequately before and after this discharge point.

It has been found desirable, and this is another aspect of the invention, to mount the deflector in a pivotable manner about a vertical joint bolt. It is preferred to position the pivot at the side of the longwall conveyor opposite to the discharge thereof. The deflector is suitably maintained in its deflecting position by any convenient securing member.

It has been found to be desirable, and this is still another aspect of this invention, to provide a shear pin or bolt as the securing member. In this way it is practical to introduce an overload safety factor into the apparatus whereby upon overload of the deflection means, the bolt or pin is sheared permitting the deflecting means to pivot and "open" thus relieving the overload.

It is still another aspect of this invention to provide an automatic shutoff for the longwall conveyor and, if desired, the mining machine associated therewith. According to this aspect of this invention, switch means is positioned in operative relation to the deflecting means. The switch is positioned to be actuated by the pivoting of the deflection member such that when the deflection member is in an "open" position, that is a position whereby large chunks of mineral are permitted to bypass transference from the first or longwall conveyor to the second or roadway conveyor, the longwall conveyor drive mechanism is stopped by tripping the switch.

This arrangement is particularly advantageous in the event of an overload on the deflection member causing breakage of the shear pin. As the pin shears, the deflection member will pivot and trip the cutoff switch. In this way damage in the case of blockage can be prevented. For this purpose a simple switch will suffice which may be held in its open position by the deflector when such is situated in the working position, but is automatically closed, perhaps by spring force, when the deflector swings back into its inoperative position.

It is advisable to arrange the deflector on a gantry spanning over the longwall conveyor. For this purpose the conveyor can carry guide rails on both sides, around which claws of the deflector gantry partially grasp. Furthermore a suitable shifting apparatus can be provided so that the deflector can, if necessary, be rapidly shifted somewhat in the longitudinal direction of the longwall conveyor. Such shifting may be advisable during advancing of the work. An hydraulic means, e.g., a cylinder-piston which in turn is secured to the longwall conveyor and the piston rod of which is articulatedly attached to the deflector gantry, is simplest.

The deflector is advantageously made concave in vertical cross-section. The lower edge can be in the form of a replaceable blade and may be canted toward the horizontal. The advanced upper edge prevents the coarse pieces of material pushed by the conveyor chain against the deflector from passing over the deflection. It would appear advisable then to provide the gantry at the discharge end of the deflector plate with a stationary transfer chute, which may extend down as far as the attached plates of the roadway conveyor.

The guide rails may be secured on the conveyor and may be used to mount the deflector and/or for the pressure-medium (hydraulic) cylinder.

In order to prevent coal from being lost at the transfer station, it is advisable to provide the roadway conveyor, at least over the length of the gallery exit, with attached plates formed in funnel shape. The gallery conveyor should here be laid so that the one guard plate reaches to the upper face or abuts against the upper face. In this way, it is possible to achieve the object that the coal discharged laterally by the deflector and the coal loaded into the longwall conveyor at the end of the gallery by the coal plough slip into the roadway conveyor without falling, that is without generating dust and without loss.

The end of the longwall conveyor at which the conveyor belt or chain reverses direction is advantageously covered, over the reversing drum, in such manner that any fine material scraped by the scraper belt over the discharge apertures provided in the bottom of the longwall conveyor is carried into the lower reversing run, in order then to fall thence into the roadway conveyor.

Understanding of this invention will be facilitated by reference to the accompanying drawing, wherein.

The longwall conveyor 10 is to deliver material onto the transversely extending roadway conveyor 11.

Figure 1:
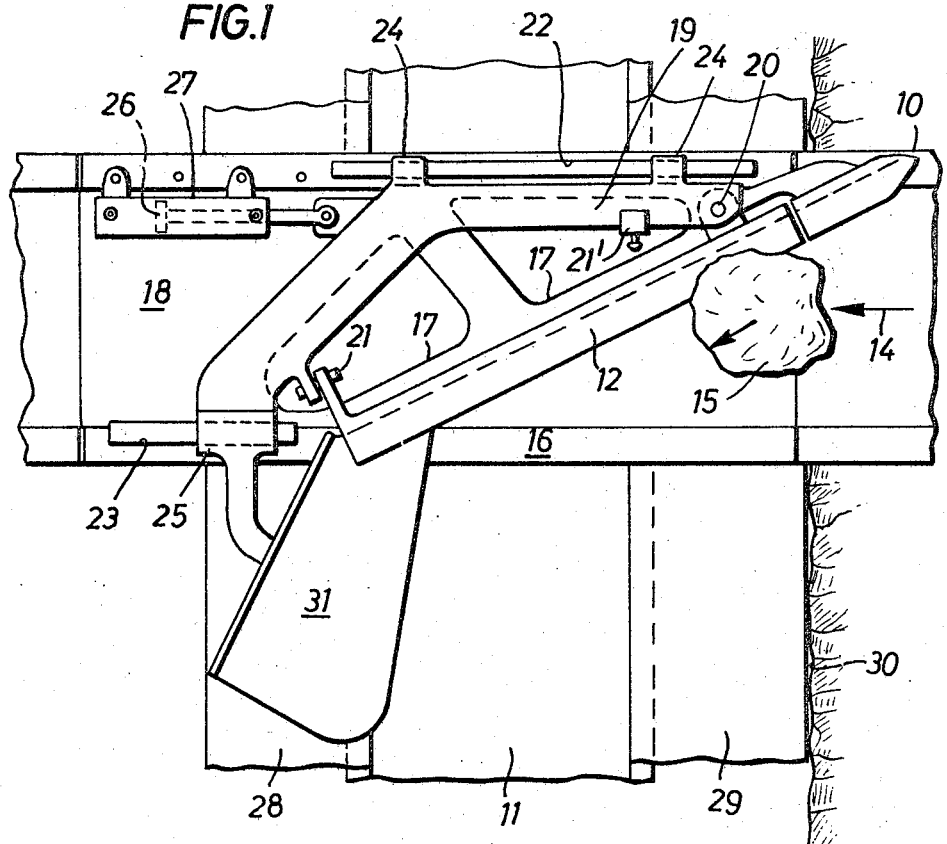
FIG. 1 shows a plan view of the transfer apparatus.
Figure 2:
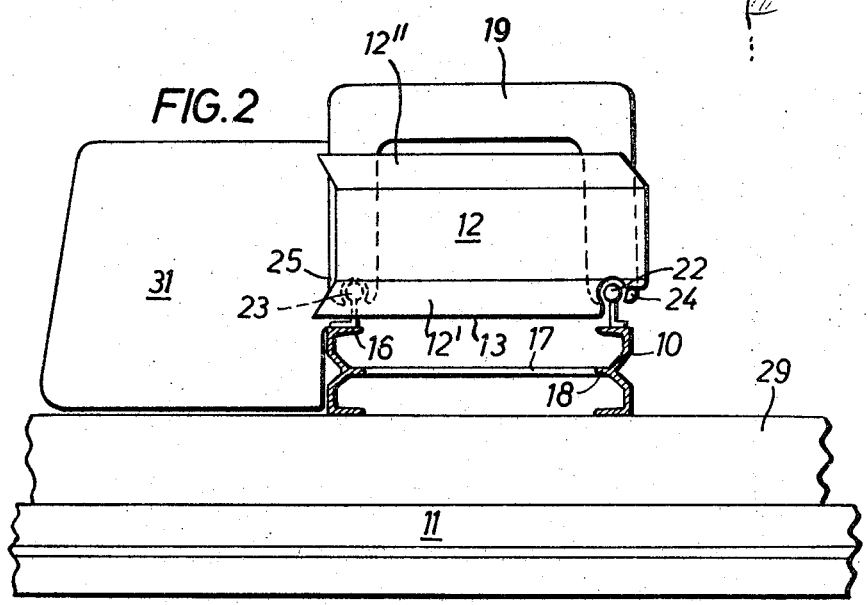
FIG. 2 shows a view of the transfer apparatus looking in the direction towards the longwall conveyor length.

In order to achieve this, according to the invention an obliquely extending deflector plate 12 is arranged which obliquely spans over the longwall conveyor 10 at the transfer station. This transfer plate is made concave in its vertical profile or provided with obliquely forwardly drawn lower and upper blades 12' and 12", as may be seen clearly in FIG. 2 of the drawing. The lower blade 12' can advantageously consist of a replaceable blade. The lower edge 13 of the deflector 12 can lie slightly above the side profiles of the conveyor 10. The deflector 12 therefore causes the coarse pieces 15 of coal protruding above the conveyor profile being fed in the direction of the arrow 14 on the longwall conveyor 10 to be grasped at least with their upper part by the deflector 12 and discharged laterally over the one side profile 16 of the conveyor out onto the transversely extending roadway conveyor 11.

The fine material which is brought by the longwall conveyor moves beneath the lower deflector edge 13 and is discharged behind the deflector plate 12 through the openings 17 in the conveyor bottom 18 of the longwall conveyor into the roadway conveyor 11.

The deflector plate 12 is advantageously pivotally mounted by means of a vertical bolt 20 on one side thereof on a gantry 19. This bolt 20 lies on the side of the longwall conveyor 10 opposite to the discharge side. The deflector is held in its working position, that is in the position as illustrated in the drawing obliquely spanning over the conveyor 10, by a shear bolt 21. If the deflector 12 for any reason is not capable of laterally discharging one or more coarse pieces 15 of the conveyed material (for example hard rock) brought by the scraper chain, then the bolt 21 breaks. The deflector plate 12 can then pivot in the clockwise direction. In this case it finally strikes against the switch 21'. Thus the conveyor drive is automatically shut off.

The gantry 19 is displaceably secured on the two guide rails 22 and 23. The guide rails are secured, possibly transferably, on the side profiles of the longwall conveyor. The rails 22 and 23 are grasped by claws 24 and 25 of the gantry in such manner that lifting of the gantry perpendicularly of the longitudinal direction of the longwall conveyor 10 is impossible. The gantry 19 is held in its working position by a hydraulic piston 26, which is displaceable in a cylinder 27. The cylinder 27 in turn is also supported, possibly transferably, on the side profile of the longwall conveyor 10. With the aid of the piston 26, the gantry 19 and the deflector 12 can be shifted in the longitudinal direction along the longwall conveyor so that a clean transfer of the coarse pieces of material 15 onto the roadway conveyor 11 is assured. In the embodiment as shown, the roadway conveyor 11 is provided on both sides with attached guard plates 28 and 29 arranged in funnel form. The latter reaches as far as the upper face 30 of the conveying roadway.

In the embodiment shown, a stationary discharge chute 31 is also connected to the gantry 19. This chute 31 adjoins the discharge end of the deflector 12 and it reliably conducts the transferred coarse pieces of material between the sides, widely opened by the attached guard plates 28 and 29, of the roadway conveyor 11. The transfer chute 31 extends as far as the sides and bottom 28, 29 and 11 of the roadway conveyor, and under some circumstances can even extend down even lower.

Under some circumstances, it can be advantageous to conduct the conveying run of the roadway conveyor through between the forward and the return runs of the longwall conveyor. This reduces the falling height of the transferred material and thus at the same time also substantially reduces the dust formation at the transfer station.

This arrangement is not only suitable for the discharge of coal from a gallery as here described. It can be used for the deflection of any desired minerals from one conveyor onto a second conveying apparatus lying at an angle therebeneath.

What is claimed is:

1. Apparatus for transferring solid lump material from a first conveyor to a second conveyor moving transversely to said first conveyor which comprises said second conveyor being disposed beneath said first conveyor; an obliquely disposed deflection plate articulately connected across said first conveyor vertically spaced from said first conveyor and longitudinally slidably mounted to said first conveyor; and means defining at least one opening in said first conveyor downstream of said deflection plate whereby large pieces of said material are deflected off said first conveyor onto said second conveyor and small pieces and fines pass through said opening from said first conveyor to said second conveyor.

2. Apparatus as claimed in claim 1 wherein longitudinal side walls are provided on said first conveyor and said deflector is spaced above the top of said side walls and longitudinally slidably attached thereto.

3. Apparatus as claimed in claim 2 wherein the side wall of said first conveyor is lower at the place of transfer of said large pieces of material.

4. Apparatus as claimed in claim 1 wherein said first conveyor has longitudinal cover means thereon except in the vicinity of said deflector.

5. Apparatus as claimed in claim 1 having switch means operatively associated with said deflector.

6. Apparatus as claimed in claim 1 including a gantry spanning said first conveyor to which gantry said deflector is articulately connected.

7. Apparatus as claimed in claim 6 including guide rails on said first conveyor to which said gantry is slidably connected through claws.

8. Apparatus as claimed in claim 6 including piston means operatively associated with said gantry and said deflector attached to a side wall of said first conveyor.

9. Apparatus claimed in claim 6 wherein said deflector has a substantially concave vertical cross section.

10. Apparatus as claimed in claim 6 including a discharge chute operatively associated with said deflector and directed toward said second conveyor.

11. Apparatus as claimed in claim 6 including a discharge chute extending between said gantry and said second conveyor.

12. Apparatus as claimed in claim 1 wherein said deflector has a removably attached blade as its lower portion.

13. Apparatus as claimed in claim 12 wherein said blade is canted toward the horizontal.

14. Apparatus as claimed in claim 1 including guard plates rising from the sides of said second conveyor.

15. Apparatus as claimed in claim 1 including reversing means for said first conveyor disposed downstream of said deflector and cover means over said reversing means adapted to receive material remaining on said first conveyor upon reversal thereof and adapted to transfer said material to said second conveyor.

16. Appratus as claimed in claim 1 including breaking apparatus adjoining said transfer apparatus.

17. Apparatus as claimed in claim 1 wherein said second conveyor passes between the forward and reverse run of said first conveyor.

18. Apparatus as claimed in claim 1 wherein said material is coal.

19. Apparatus as claimed in claim 6 wherein said deflector is pivotally mounted to the side of said first conveyor opposite said gantry at the side thereof over which said large pieces of material are transferred.

20. Apparatus as claimed in claim 9 wherein said deflector is secured to said gantry at the side opposite to said pivotal mount by a shear bolt.

21. Apparatus as claimed in claim 9 having switch means associated with said deflector operative upon pivoting of said deflector.

References Cited

UNITED STATES PATENTS

| | | | |
|---|---|---|---|
| 2,736,420 | 2/1956 | McCarthy | 198—188 X |
| 2,951,576 | 9/1960 | Buckeridge | 198—232 X |
| 3,236,362 | 2/1966 | Hackbarth | 198—188 |
| 3,292,773 | 12/1966 | Keehart | 198—204 |

FOREIGN PATENTS

| | | |
|---|---|---|
| 651,040 | 10/1937 | Germany. |

EDWARD SROKA, Primary Examiner